May 14, 1968                  W. VOLK                  3,383,200
REDUCTION OF METALLIC OXIDES
Filed Nov. 28, 1966
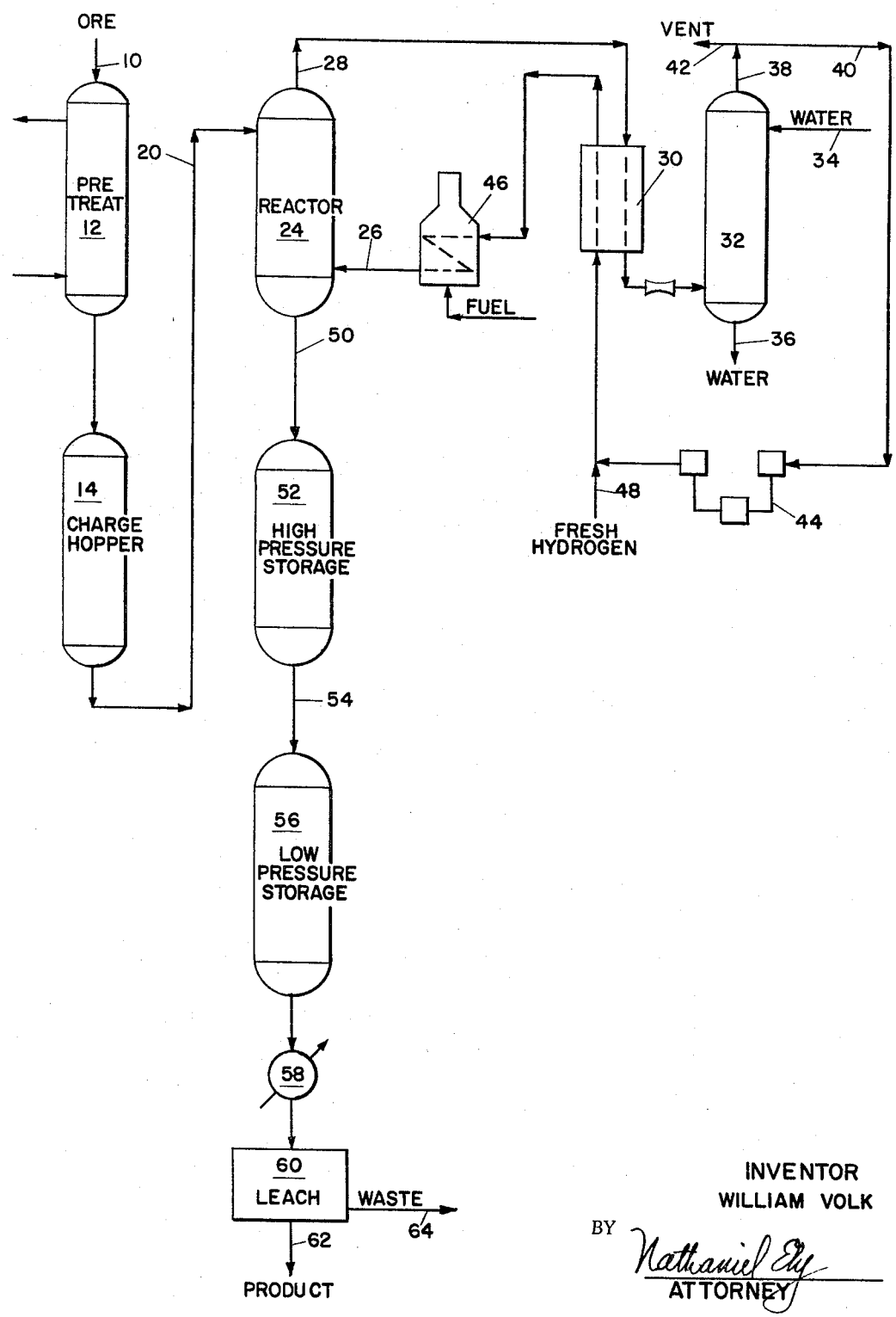
INVENTOR
WILLIAM VOLK
BY Nathaniel Ely
ATTORNEY

# United States Patent Office 3,383,200
Patented May 14, 1968

3,383,200
REDUCTION OF METALLIC OXIDES
William Volk, Princeton, N.J., assignor to Hydrocarbon Research, Inc., New York, N.Y., a corporation of New Jersey
Continuation-in-part of application Ser. No. 491,487, Sept. 13, 1965. This application Nov. 28, 1966, Ser. No. 611,192
1 Claim. (Cl. 75—26)

ABSTRACT OF THE DISCLOSURE

A process for recovery of high purity non-ferrous values such as $TiO_2$ from iron ores containing mixed oxides such as ilmenite. A fluidized bed of the finely ground ore is reduced with high concentration hydrogen gas substantially free of carbon monoxide at temperatures between 1100° to 1400° F. The reduced product is leached in 10% sulfuric acid at atmospheric pressure.

CROSS REFERENCES TO RELATED APPLICATIONS

Ser. No. 246,589, filed Dec. 21, 1962, and Ser. No. 491,487, filed Sept. 13, 1965.

BACKGROUND OF THE INVENTION

This application is a continuation-in-part of my application, Ser. No. 491,487, filed Sept. 13, 1965, now abandoned, which was a continuation-in-part of an application, Ser. No. 246,589, filed Dec. 21, 1962, and now abandoned. It is more specifically a modification of the process for the reduction of ilmenite as described in the U.S. Patent No. 3,224,870 of which I am a co-inventor.

This invention relates to an improvement in the process for the recovery of high purity non-ferrous values from iron ores of low iron value containing mixed oxides including iron oxides and titanium dioxide.

It is known that in several ore treating processes, iron oxides are impurities that have to be removed in order that the more valuable metals or metal complexes may be recovered. It is the custom in some of these processes to leach out the iron oxides as the purification step. It is, therefore, desirable that the iron oxide be in a form which is soluble in commercial acids. However, it has been found that the complex of the non-metallic oxide with the iron oxide significantly interferes with the solubility of the iron oxide in the leaching agent. Where partial reduction to metallic iron has been accomplished, the presence of the residual iron oxides makes it necessary to use high concentrations of nitric acid for complete dissolution of the iron values.

For example, in unreduced titanium ores containing in the order of 20 to 35% of iron oxide, only about half of the iron oxide can be leached in the dilute acid. This materially interferes with the commercial recovery of the non-ferrous oxides which are the more valuable product.

In my prior experience (U.S. Patent 3,224,870), I have found that a preliminary reduction of an ilmenite ore at temperatures below which the oxide of titanium is reduced, makes it possible to melt the partially reduced ore and to remove the titanium oxide in the slag. While this assures the production of a substantially pure iron, free of titanium, it requires a melting process which appears to be justified only when the iron has a sufficient value for its recovery. In this process a $TiO_2$ purity of approximately 80% is obtained and, of course, the slag containing the $TiO_2$ must be ground to desired particle size for further purification.

There are numerous cases where the ore has such a low concentration of iron that it is completely uneconomical to recover any of the iron values. In fact, it is with such ores that the iron oxides are generally leached with acid to recover the non-ferrous values with the iron salts discharged as waste.

SUMMARY

The principal object of my invention is to provide an improved process for the recovery of high purity non-ferrous values from an iron oxide containing ore.

A further object of my invention is to provide a pretreatment of an iron ore containing other metallic oxides whereby these other metallic oxides can easily be recovered.

BRIEF DESCRIPTION OF THE DRAWING

The attached drawing is a schematic flow diagram of the principal pieces of apparatus used in an ore reduction process.

DESCRIPTION OF PREFERRED EMBODIMENT

The particular apparatus hereinafter described is primarily adapted to treat a complex oxide ore of the nature of Quilon ilmenite which has in the order of 60% $TiO_2$ and from 20 to 30% iron oxides together with various other oxides as hereinafter described whereby at least 85% of the oxides in the iron oxide are reduced without effecting the reduction of the $TiO_2$ and less than 1.5% by weight of ferrous impurities remain with the $TiO_2$.

While not shown in the drawing, the ore is usually initially sized so that all passes 20 mesh and about 10% passes 325 mesh (Tyler). However, this step may not be required for ores that are naturally granular, e.g., ilmenite sands from India or New Zealand. This ore then entering through line 10 may be preheated in the pretreat chamber 12, as for example, for drying or preheating as by passing a suitable gas through it. The ore is then held in the charge hopper 14 from which it can be transported by line 20 to reactor 24.

The reactor 24 may be of the type shown in the Keith et al. patent, 2,995,426, patented Aug. 8, 1961, and is customarily a vertical reactor subdivided into one or more vertically disposed beds of ore through which the reducing gas entering at 26 passes upwardly for the reaction with the oxides. As hereinafter described, the reducing gas is preferably hydrogen, and of a purity as expressed in the Keith et al. Patent 2,900,246. As described in such patent, high purity hydrogen means hydrogen containing only small amounts of such gases as carbon monoxide and dioxide, methane, nitrogen and water vapor; more specifically, the high purity hydrogen used in the process of this invention generally has a composite average molecular weight in the range of about 3 to 7.5, preferably less than about 5.5. Since hydrogen has a molecular weight of 2 and the aforesaid admixed gases have molecular weights varying from 16 to 44, it is obvious that the quantities of the admixed gases must be kept small to hold the composite average molecular weight below the upper limit of 7.5. In addition, it must have only a minimum or no concentration of carbon monoxide which I find interferes with the subsequent leaching apparently due to the formation of insoluble iron compounds.

An ilmenite ore, as above described, may be retained in a fluidized condition with the gas velocity through the bed of iron ½ to 1½ feet per second at temperatures in the order of 1100° to 1400° F. Preferably the reaction temperature is 1300° F. and the operation is carried out under a total pressure in the order of 200 p.s.i.g. using at least 85% purity hydrogen. A hydrogen partial pressure of at least 150 p.s.i. is indicated for commercial operations.

The effluent of unreacted hydrogen and water vapor removed overhead at 28 passes through a suitable heat exchanger 30 and into water scrubbing tower 32 supplied with water at 34 to cool and condense the water which is removed at 36. The hydrogen which passes overhead at 38 is primarily recycled through the line 40 as hereinafter described although a part may be purged from time to time at 42 to prevent buildup of undesired gaseous products.

The recycled hydrogen in line 40 is preferably recompressed at 44, passed through the heat exchanger 30 to pick up heat from the effluent stream 28 and further heated in heater 46. This gas thus becomes the principal part of the feed in line 26 to the reactor 24. Fresh makeup hydrogen may be added at 48. Recycle ratios of 10 parts of repurified hydrogen to 1 part of fresh hydrogen are customary.

The hydrogen accomplishes a reduction of the iron oxide as it passes through the bed of ore. I have observed that this reduction on ore of mixed oxides if accomplished in the temperature range of about 1100° F. to about 1400° F. does not materially affect the other oxides but does accomplish an effective reduction of the iron oxide. In the particular case herein, the reduced ore, which is at least 85% reduced with respect to the iron oxides, is removed through the discharge line 50 to a high pressure product storage vessel 52 and thence through line 54 to low pressure storage vessel 56. Subsequently, the ore may pass through the heat exchanger 58 for further cooling as it passes to the acid leach tank 60.

The preliminary reduction of mixed oxide ores by hydrogen in a fluidized bed under super-atmospheric pressure and at temperatures below 1400° F. has so reduced the iron oxides to metallic iron as to permit ready solubility of the iron in dilute sulfuric acid for the production of iron sulphate. In the leach tank 60, the reduced iron is dissolved in 10% sulfuric acid solution at atmospheric pressure. The titanium dioxide is recovered as at 62 in a highly purified condition and the iron salts removed at 64.

A specific ore of the following composition was treated by my process at 1300° F. and 200 p.s.i.g. with the indicated results as follows being obtained:

|  | Wt. Percent | |
|---|---|---|
|  | Charge | Product |
| Quilon Ore (Water Free): | | |
| Fe | 25 | 27.5 |
| Reducible O$_2$ | 9.6 | .5 |
| TiO$_2$ | 59.8 | 65.8 |
| SiO$_2$ | 1 | 1 |
| Al$_2$O$_3$ | 2 | 2 |
| MgO | 1.1 | 1.2 |
| Others: (CaO, P$_2$O$_5$, V$_2$O$_5$, Cr$_2$O$_3$, MnO) | <2.0 | 2.0 |

This shows a 94% by weight purity of the recovered TiO$_2$ and a total ferrous impurity of 1.3% by weight.

It was also found that in reduction of the same ore at 1600° F. using 2:1 hydrogen-carbon monoxide gas at atmospheric pressure, the presence of carbon monoxide hindered the production of soluble iron as shown by comparing condition (1) with condition (2) below:

|  | Total Iron | Soluble Iron | Insoluble Iron |
|---|---|---|---|
| Weight Percent: | | | |
| Ore | 25.6 | 8.8 | 16.8 |
| After ½ hr. H$_2$ + CO | 26.6 | 22.5 | 4.2 |
| (1) After 2 hrs. H$_2$ + CO | 26.5 | 22.9 | 3.6 |
| (2) After 2 hrs. H$_2$ only | 29.1 | 26.4 | 1.7 |

The presence of carbon monoxide hinders the solubilizing of the iron, even though reduction seems to be achieved.

Even at temperatures where some TiO$_2$ reduction may occur, a significant improvement in TiO$_2$ purity can be obtained by using hydrogen gas free of carbon monoxide and facilitating its recovery by dilute sulfuric acid leaching.

Other examples of TiO$_2$ purity (with respect to iron) are as follows,

| Ore | Initial Composition | | Percent Fe in recovered TiO$_2$ (leaching in 10% H$_2$SO$_4$) |
|---|---|---|---|
|  | TiO$_2$ | Iron Oxides | |
| MacIntyre | 43.5 | 44.9 | 1.5 |
| Quilon | 60.3 | 35.7 | 0.972 |

While I have shown and described a preferred form of embodiment of my invention, I am aware that modifications may be made thereof and I, therefore, desire a broad interpretation of the invention within the scope and spirit of the description herein and of the claim appended hereinafter.

I claim:

1. A process for the recovery in granular form of substantially iron free titanium oxide from ores selected from the class consisting of Quilon and MacIntyre ilmenite and concentrates of the same, initially having high concentrations of non-ferrous values and having low concentrations of ferrous values in which a bed of the ore of a fineness to pass a 20 mesh screen is formed in a contact zone which comprises passing a high purity hydrogen gas having substantially no carbon monoxide upwardly through the bed at a velocity to cause fluidization of the bed, maintaining the contact zone under a temperature in the range of 1100° F. and 1400° F. and a hydrogen partial pressure in excess 150 p.s.i. and for a time sufficient to accomplish at least 85% reduction of the iron oxide in said ore to metallic iron without substantially changing the characteristics of the non-ferrous oxide, and leaching the reduced product in dilute sulfuric acid whereby the reduced iron non-ferrous mixture yields a granular product containing more than 85% by weight of non-ferrous oxides and less than 1.5% iron impurity.

References Cited

UNITED STATES PATENTS

| 2,339,808 | 1/1944 | Ravnestad et al. | 75—1 |
| 2,912,320 | 11/1959 | Chang | 75—101 |
| 3,105,755 | 10/1963 | Green | 75—1 |
| 3,224,870 | 12/1965 | Johnson et al. | 75—26 |

BENJAMIN HENKIN, *Primary Examiner.*